May 15, 1951     H. J. BURNETT     2,553,129
ELECTRICAL VALVE SEAT GAUGE
Filed June 9, 1944
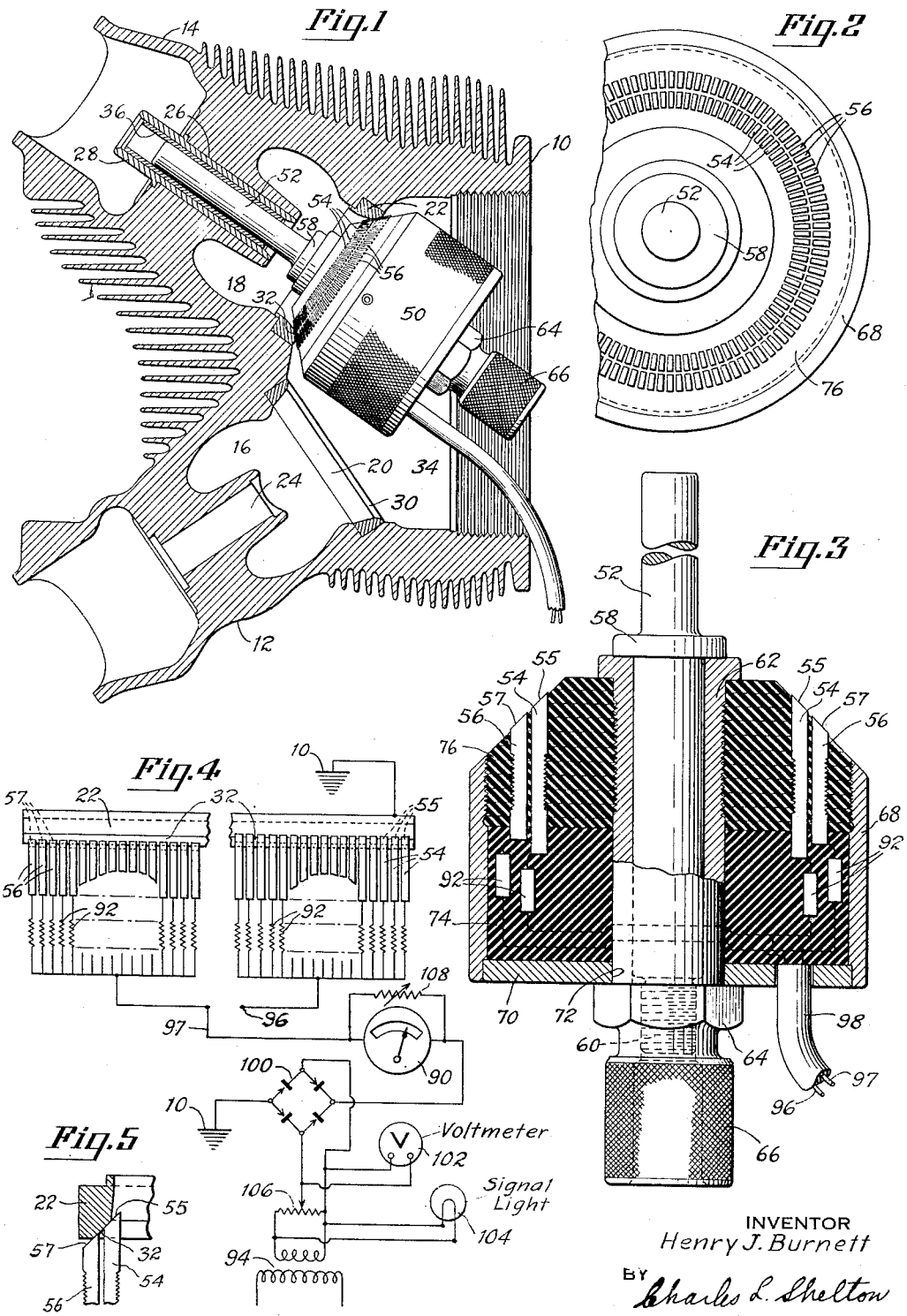
INVENTOR
Henry J. Burnett
BY Charles L. Shelton
ATTORNEY.

Patented May 15, 1951

2,553,129

UNITED STATES PATENT OFFICE 2,553,129

ELECTRICAL VALVE SEAT GAUGE

Henry J. Burnett, West Hartford, Conn., assignor to United Aircraft Corporation, East Hartford, Conn., a corporation of Delaware Application June 9, 1944, Serial No. 539,408

4 Claims. (Cl. 33—174)

This invention relates to an electrical gauge, particularly adapted for checking the valve seats of a radial aircraft engine.

An object of this invention is to provide improvements in valve seat gauging apparatus whereby the accuracy of a valve seat may be electrically determined, quickly and accurately. More particularly it is an object of the invention to determine the accuracy of the surface of a conical valve seat over its valve contacting area.

Other objects and advantages will be apparent from the specification and claims, and from the accompanying drawing which illustrates what is now considered to be a preferred embodiment of the invention.

In the drawing,

Fig. 1 is a sectional view of an aluminum alloy head for an air cooled radial aircraft engine, showing the gauge of this invention in position to test the accuracy of the exhaust valve seat.

Fig. 2 is an end view of a portion of the valve seat gauge of Fig. 1.

Fig. 3 is a side view, partly in section, of the gauge of Fig. 1.

Fig. 4 is a schematic view showing a developed valve seat and the relation of the inner and outer rows of contacts to the valve seat, and includes a circuit diagram for one of the rows of contacts.

Fig. 5 is a schematic cross-sectional view of a valve seat insert, showing a pair of contacts in testing position relative to the valve seat.

Before this invention, it was the usual practice in checking the accuracy of a valve seat (for instance after a lapping or grinding operation) to remove the grinding wheel assembly and then, after wiping the valve stem guide and the valve seat perfectly clean, to insert a gauge in the form of a dummy valve of correct proportions. By placing Prussian blue between the seating surfaces of the valve and the valve seat and then slightly rotating the valve, it was possible to determine the percentage of bearing between the seating surfaces by noting the uniformity of distribution of the Prussian blue around the valve seat after the dummy valve was removed. Such a testing procedure is tedious and requires considerable skill.

According to the present invention, the determination or inspection of valve seat dimensions and proportions is made electrically and automatically, simply by placing a gauge against the seating surface to be tested. No more skill than that necessary to read an indicating instrument is required to show the percentage of accuracy of the seat, hence personal errors are eliminated by the gauging device of this invention.

Referring to the embodiment of the drawing, the conventional cylinder head 10 has valve rocker boxes 12 and 14 extending outwardly therefrom and has an inlet passage 16 and an exhaust passage 18 controlled by valves (not shown) which seat against the intake valve seat insert 20 and the exhaust valve seat insert 22. The rocker boxes have bores 24, 26 in which valve stem guides, such as the one shown at 28, are inserted. The valve seat inserts are formed (for instance by grinding and lapping) with seating surfaces 30, 32 against which the seating surface of the valve heads bear to seal the respective passages 16, 18 from combustion chamber 34. In conventional manufacturing practice, these seats are formed by grinding, the grinding machine (not shown) being positioned in relation to the valve seat by the valve guide 28, for instance by an arbor guided by a liner 36 temporarily inserted within the valve guide. After rough and finish grinding, the seats may be lapped. Whatever their method of formation, it is essential that the seating surface be of exactly the correct dimensions and of the proper angle, within very close tolerances. These may be determined very quickly and accurately by the gauge 50.

Gauge 50 is provided with a stem 52 which may be fitted within the liner 36 after the grinding wheel assembly is removed, thus positioning the gauge and the circumferential rows of electrical contacts 54, 56 thereon with respect to valve seat 32. If the seating surface on the insert 22 is of exactly the proper angle, dimensions and proportions, each of the numerous contacts in the inner row 54 and in the outer row 56 will contact the corresponding portion of the seating surface 32 and thus will be grounded or electrically connected to the head 10.

As shown in Fig. 3, stem 52 is provided with an intermediate flange 58 and a threaded end 60. A bushing 62 is fitted over the intermediate portion of the stem and is clamped between flange 58 and a nut 64, which is screwed on the thread 60 and which has a knurled handle 66. A housing, including a cylindrical metal shell 68 and a fibre disc closure 70 pressed into the shell, surrounds the bushing 62, which extends through an opening 72 in the center of the closure 70. A plug 76 of hard, solid electrical insulating material, for instance of phenolic base resin or Lucite, fills the upper portion of the housing between shell 68 and bushing 62, while the lower portion of the housing is filled with insulating material such as wax 74. The plug 76 may be either molded in place within the housing or molded separately and then assembled by screw threading to shell 68 and bushing 62. After the plug 76 is in place within the housing resistors 92 are inserted and wired to the bars by leads 96, 97. Then molten wax 74 is poured into the housing and fibre disc 70 is pressed in place and secured by screwing nut 64 on end 60. Whichever the method of assembly, an inner circumferential row 54 and an outer circumferential row 56 of individual hardened steel or copper bars are set in the plug 76, preferably by molding the resin around the bars. These bars or rods are permanently retained in predetermined position relative to each other and are insulated from each other by the hardened insulating material. The exposed end of the plug 76 is machined off to provide a tapered or conical face from which the contact ends of the bars project slightly (Fig. 3), and the contact surfaces 55 of the inner row of bars are machined to the exact circumferential contour, angle and dimensions as the corresponding inner circumferential portion of the seating surface of a properly proportioned valve seat, while the contact surfaces 57 of the outer row of bars 56 are machined to the exact contour, angle and dimensions as the outer circumferential portion of a properly proportioned valve seat. Contact faces 55 and 57 are positioned with respect to each other so as to be in the same angular relationship or plane as the inner and outer circumferential portions of the seating surface of a correct valve seat. For instance, in some commercial engines the correct valve seat angle is forty-five degrees and to check these engines the surfaces 55, 57 should be positioned at a forty-five degree angle. As shown in Fig. 5, the width of both contact surfaces is made greater than the width of the seat, so that only adjacent portions of surfaces 55, 57 contact the seat 32. Surfaces 55 of the inner row 54 and surfaces 57 of the outer row 56 are concentric with the axis of the valve stem guide 28; hence if the seat being tested is of the wrong apex angle or is not concentric with the valve stem guide then one or more of the contact bars will not bear on the seat. Similarly, improper valve seat dimensions, irregularities or imperfections in the seating surface will prevent full bearing of all the contact bars.

A resistor 92 is connected in series with each contact bar and all the bars of each row, together with their corresponding resistors, are connected in parallel with respect to each other. Thus the outer row of contact bars 56 are all connected to form a unit which is connected by a lead 97 (Fig. 4) to an indicating instrument, such as a D. C. micro-ammeter 90. Contacts 54 of the inner row may be connected in like manner by lead 96 to a second ammeter (not shown). Thus there will be two indicating instruments 90 and associated circuits, connected respectively to each of the rows of contacts 54 and 56. One end of each indicating instrument is connected to a rectifier 100 which is also connected to ground and is energized by a transformer 94 whose primary may be supplied with a 60 cycle 110 volt alternating current. A potentiometer 106 is provided to regulate the voltage applied to the test circuit and signal light 104 and voltmeter 102 respectively show when the circuit is energized and the value of the voltage applied. Adjustable resistance 108 may be used to vary the setting of meter 90.

In order that absolute readings may be made, in percentage of bearing area between the contact bars and the valve seat being tested, there are preferably 100 bars in each of the circumferential rows 54 and 56. Transformer 94 is a step down transformer and the voltage applied across each row of contact bars is adjusted to one volt. Resistors 92 are of one megohm resistance and thus the current flowing through each row of bars and the respective ammeter 90, if all the bars in the row make contact with the seat, would be 100 micro-amperes. If only 98 of the contacts bear on the seat, then only 98 microamperes would flow, or in other words, one microampere flows for each bar that makes electrical contact with the valve seat. Thus the number of micro-amperes flowing through each meter is a direct indication of the number of contacts in the corresponding row bearing on the seat and the ammeter may be read directly in percentage of bearing area. This is true for each of the circumferential rows of contacts and the percentage of bearing area at either the inner or the outer circumferential portion of the seat may be read on the respective meter in percent of bearing area. An inaccuracy in the apex angle of the seat or its relation to the axis of the valve guide may be determined by noting variations in the readings of the two meters, which would indicate differences between the percentage of bearing area for the inner and outer circumferential portions of the seat. If the valve seat is of exactly the correct shape and angle, each of the two indicating instruments for the respective contact rows 54, 56 will give their full reading. But if the seat is outside predetermined tolerances, for instance by being out of round at either the inner or outer circumferential positions, or of the wrong angle, or contains imperfections, then one or more of the contact bars will not make perfect electrical contact with the seat and one or both of the meters will read lower than its maximum value for a perfect seat.

It has been found that with the gauge of this invention the quality of a valve seat may be accurately gauged regardless of whether or not liquid may be present on the seat. Thus gauging is considerably facilitated because it is not necessary to have the seat perfectly clean, as it was according to prior practice, in order to perform the gauging operation. The gauge has been found to actually work better when the seat area is flushed with a stream of filtered coolant, such as kerosene, than after being wiped "clean" with a rag and the tip of the operators finger, as is practice when using Prussian blue to gauge the seat.

As shown in Fig. 1, the gauge is sufficiently compact to fit within the combustion space of a cylinder head, and may readily be designed to fit within an assembled cylinder head and barrel for testing valve seats in a completed cylinder assembly. While the positioning stem 52 is shown as a part of the gauge it might also be made as a separate member mounted in the valve bushing and over which the gauge is fitted for a testing operation.

It is to be understood that the invention is not limited to the specific embodiment herein illustrated and described, but may be used in other ways without departure from its spirit as defined by the following claims.

I claim:

1. A valve seat gauging apparatus comprising a plurality of circumferential rows of electrical contact members electrically insulated from each other, a housing structure for said members having guide means associated therewith for positioning said members in predetermined relation to a valve seat to be tested, a resistor connected in series with each of said members, a plurality of current meters connected respectively to all the members in each of said circumferential rows, and means for passing an electrical current through said meters, said members and said seat.

2. In an electrical valve seat gauge, a cup-shaped housing member, a stem member extending through said housing concentric therewith and having an extension projecting beyond the open end thereof, molded electrical insulating material closing the open end of said housing between said housing and said stem, said insulating material having a conical outer face, a pair of circumferential rows of electrical contact members retained in insulated relationship within said insulating material concentrically with respect to said stem, said members having exposed contact faces projecting slightly beyond the conical outer surface of said insulating material and being substantially parallel with respect thereto, a resistor connected to each said contact member and disposed in said housing on the inner side of said insulating material, and a pair of electrical conductors connected respectively to all of the resistors corresponding to each of said circumferential rows of contact members.

3. An electrical gauge for valve seats comprising a stem, an outer shell, a plug of electrical insulating material filling the upper portion of the shell around the stem, a circumferential row of electrical contact members in said plug, a resistor connected to each contact member, a lead in wire connecting all the resistors in said row, a plug filling the lower portion of the shell and embedding said resistors, an indicating instrument, said lead in wire being connected to said indicating instrument, a source of power, said source of power being connected to said indicating instrument.

4. An electrical gauge for valve seats comprising a stem, an intermediate stop on said stem, one end of said stem being threaded, a bushing, a nut on the threaded end of said stem, said bushing fitting on said stem between said intermediate stop and said nut, an outer shell, a plug of electrical insulating material filling the upper portion of the shell between the shell and bushing, a circumferential row of electrical contact members in said plug, a resistor connected to each contact member, a lead in wire connecting all the resistors in said row, a plug of wax filling the lower portion of the shell and embedding said resistors, a disc enclosing the lower end of said shell, said disc has an opening receiving said bushing, an indicating instrument, said lead in wire being connected to said indicating instrument, a rectifier, said rectifier being connected to said indicating instrument, a source of power, said source of power being connected to said rectifier.

HENRY J. BURNETT.

REFERENCES CITED

The following references are of record in the file of this patent:

UNITED STATES PATENTS

| Number | Name | Date |
| --- | --- | --- |
| 1,766,991 | Gardner | June 24, 1930 |
| 1,952,965 | Beard | Mar. 27, 1934 |
| 2,074,753 | McClain | Mar. 23, 1937 |
| 2,232,360 | Barnett | Feb. 18, 1941 |
| 2,332,983 | Bjorkbom | Oct. 28, 1943 |

FOREIGN PATENTS

| Number | Country | Date |
| --- | --- | --- |
| 23,439 | England | Dec. 6, 1895 |
| 544,695 | Great Britain | Apr. 23, 1942 |